(No Model.) 7 Sheets—Sheet 1.
G. C. JANNEY.
CORN HUSKER AND STALK CUTTER.
No. 568,981. Patented Oct. 6, 1896.
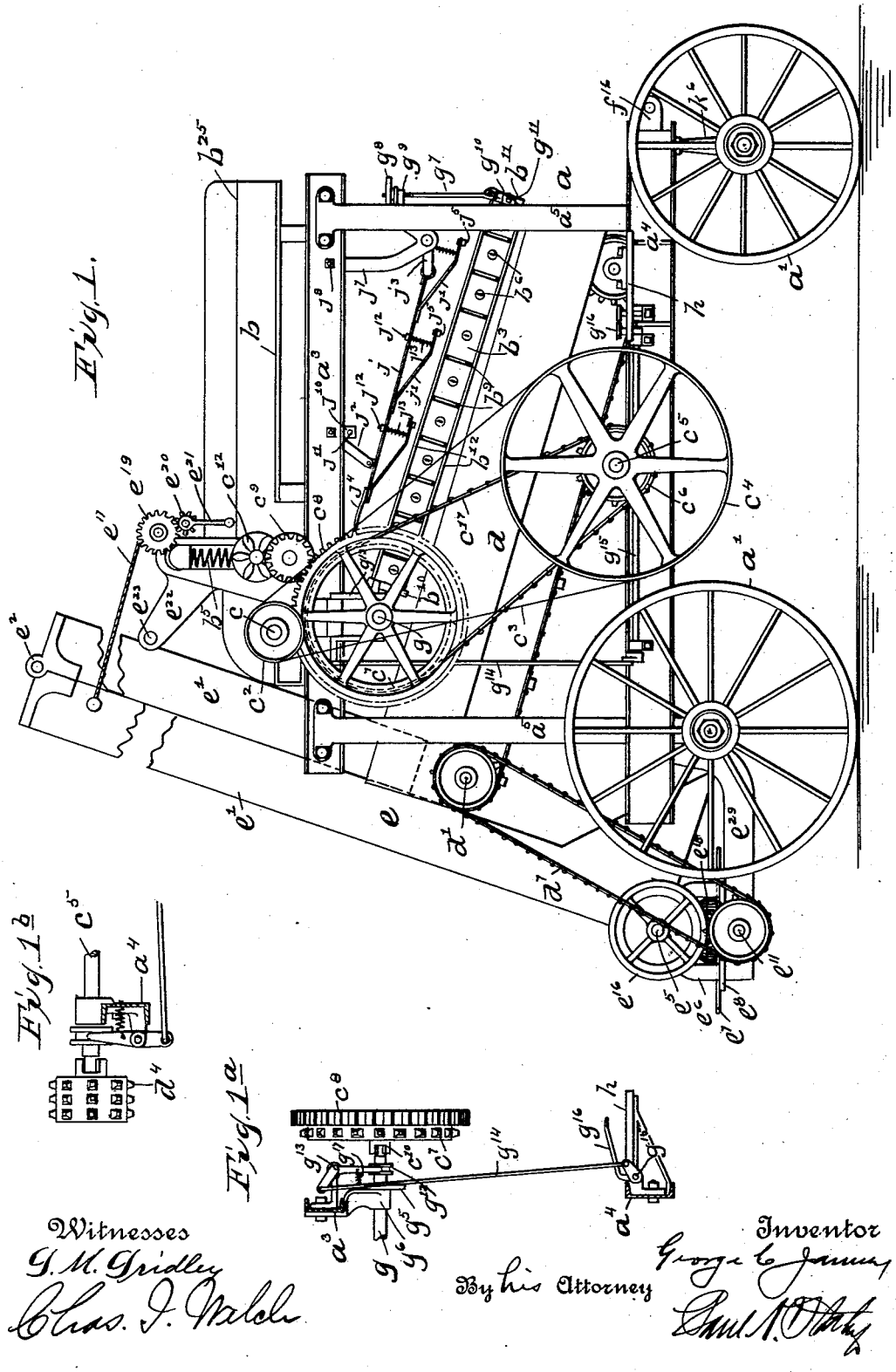

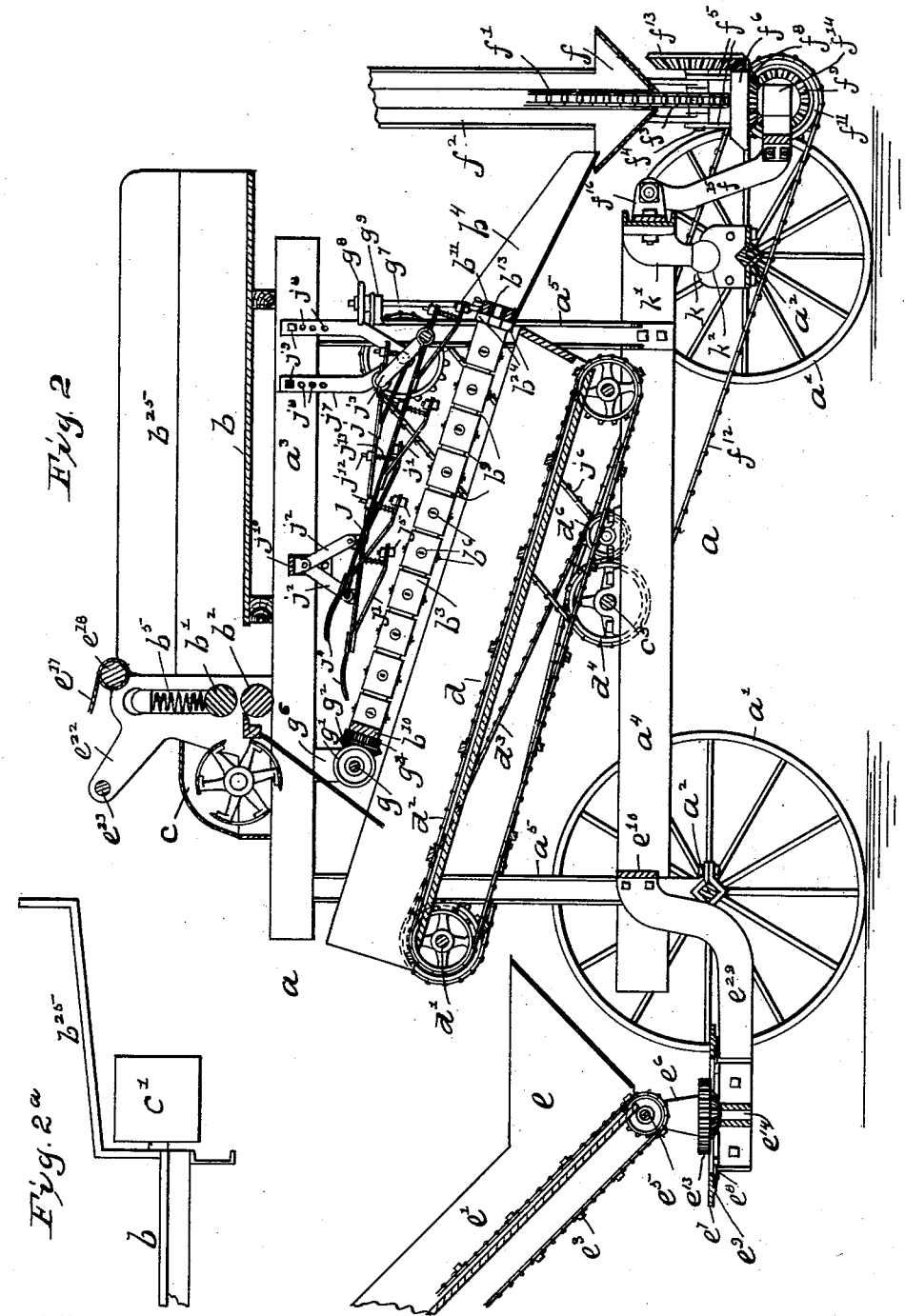

(No Model.) 7 Sheets—Sheet 3.
G. C. JANNEY.
CORN HUSKER AND STALK CUTTER.
No. 568,981. Patented Oct. 6, 1896.
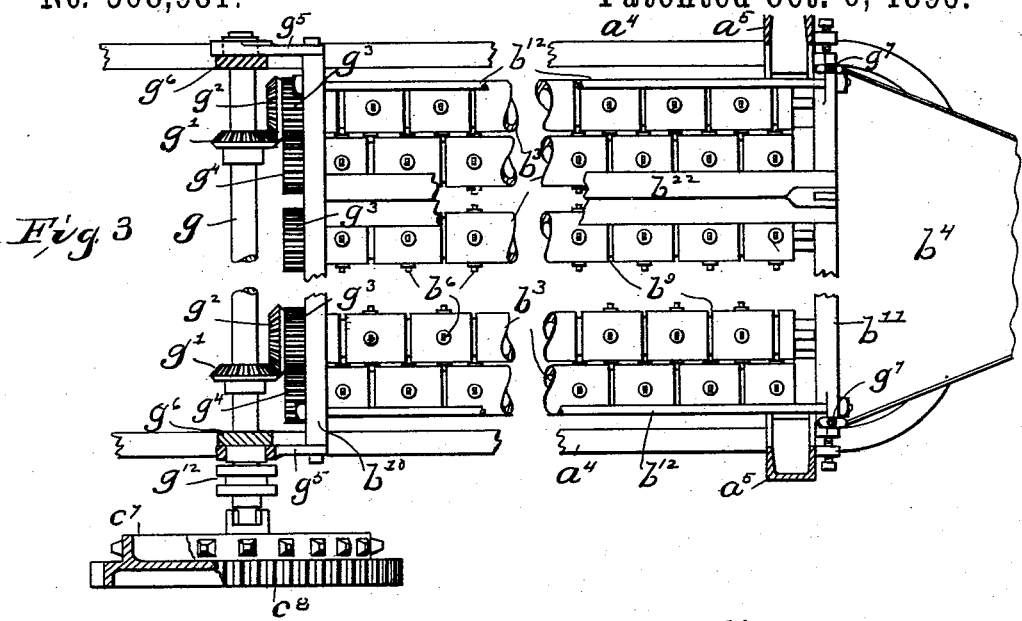
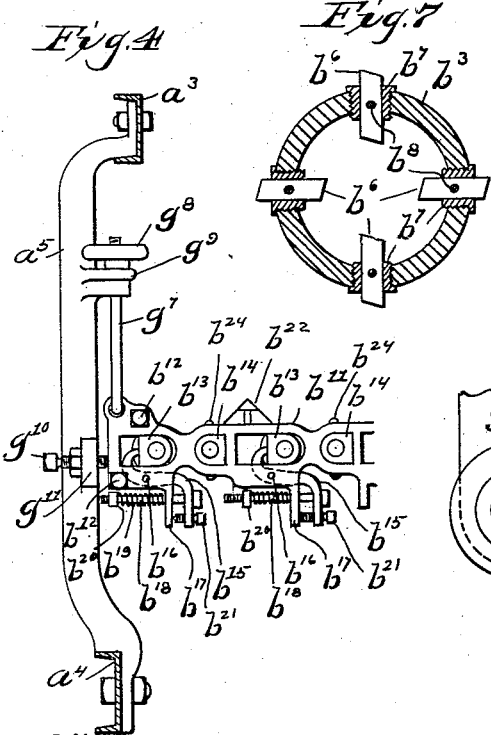
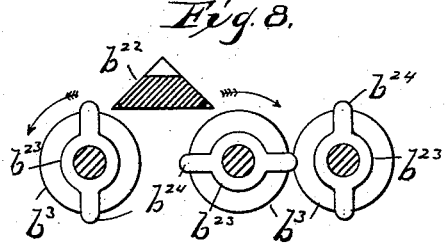
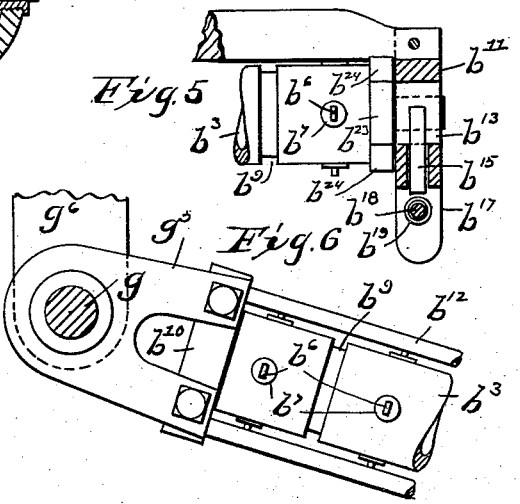
Witnesses
G. M. Gridley
Chas. J. Welch
Inventor
George C. Janney
By his Attorney (No Model.)  7 Sheets—Sheet 4.
G. C. JANNEY.
CORN HUSKER AND STALK CUTTER.
No. 568,981.  Patented Oct. 6, 1896.
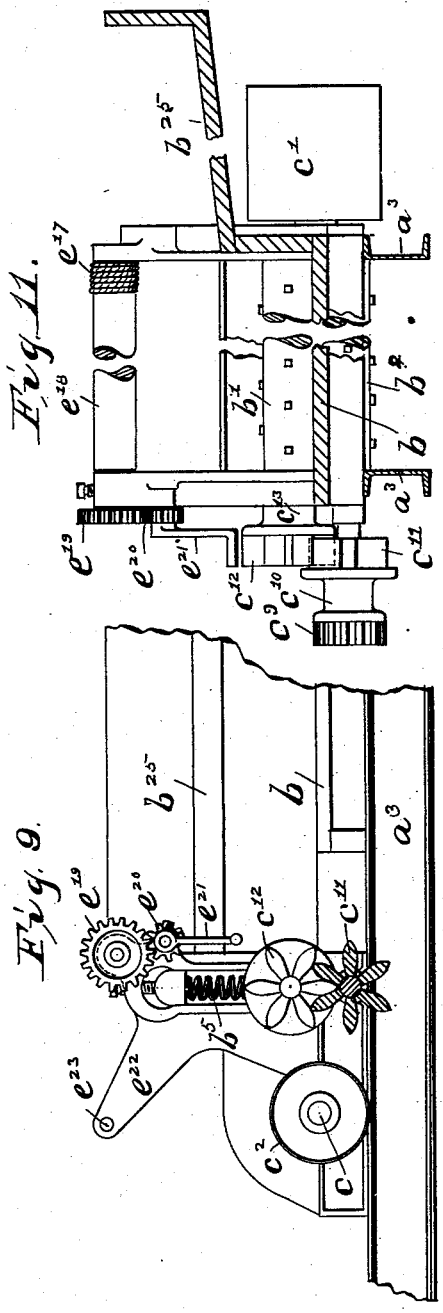
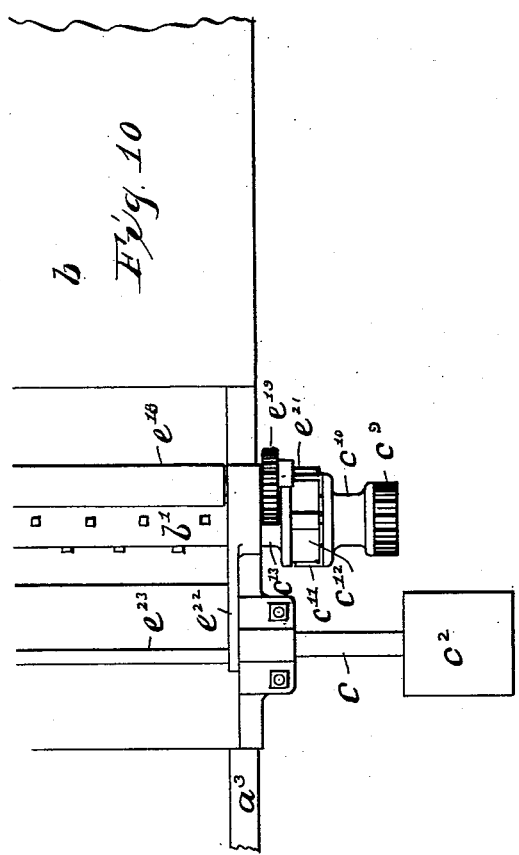
Witnesses  Inventor
George C. Janney
By his Attorney (No Model.) 7 Sheets—Sheet 5.

G. C. JANNEY.
CORN HUSKER AND STALK CUTTER.

No. 568,981. Patented Oct. 6, 1896.

Witnesses
G. M. Gridley
Chas. I. Walsh

Inventor
George C. Janney
By his Attorney

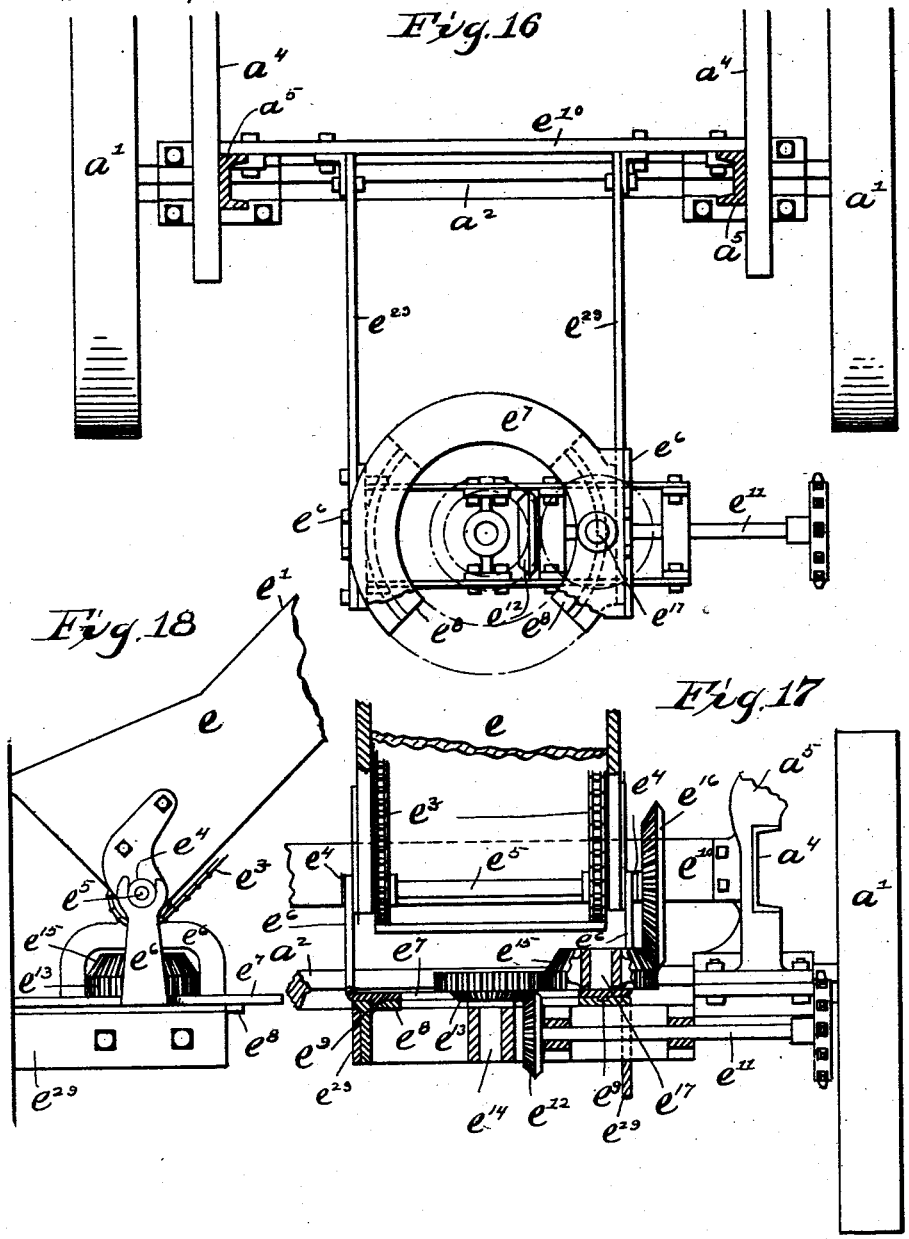

(No Model.) 7 Sheets—Sheet 7.
G. C. JANNEY.
CORN HUSKER AND STALK CUTTER.
No. 568,981. Patented Oct. 6, 1896.
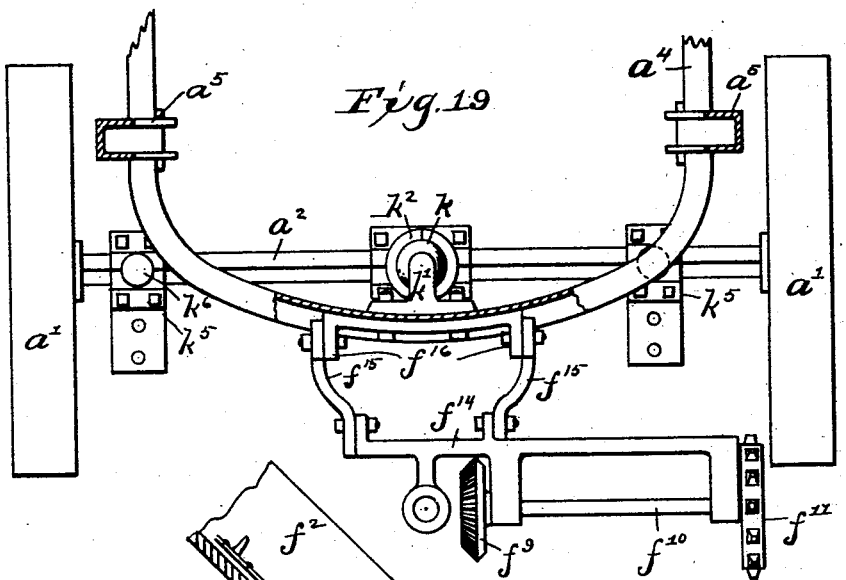
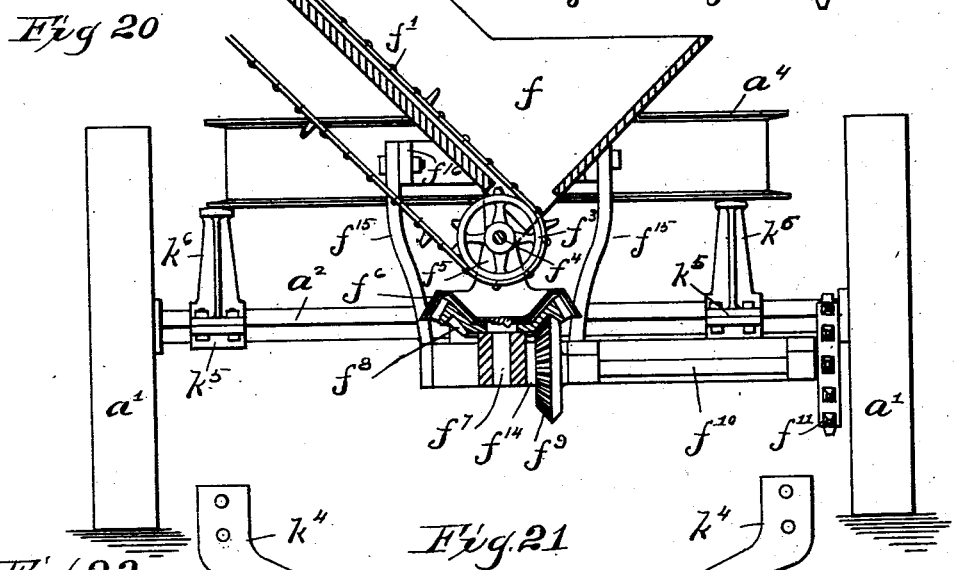
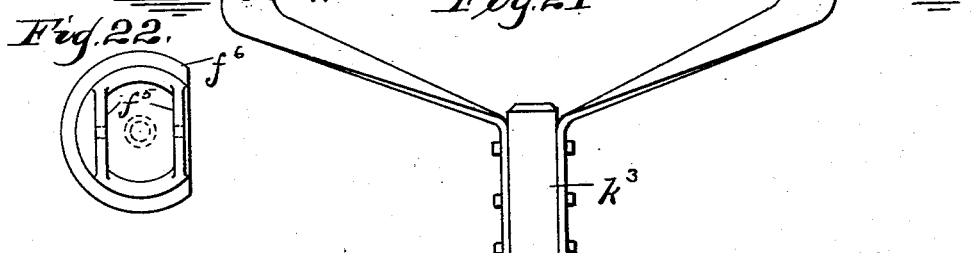
Witnesses
J. M. Gridley
Chas. J. Welch
Inventor
George C. Janney
By his Attorney

UNITED STATES PATENT OFFICE.

GEORGE C. JANNEY, OF MUNCIE, INDIANA.

CORN-HUSKER AND STALK-CUTTER.

SPECIFICATION forming part of Letters Patent No. 568,981, dated October 6, 1896.

Application filed September 9, 1895. Serial No. 561,930. (No model.)

*To all whom it may concern:*

Be it known that I, GEORGE C. JANNEY, a citizen of the United States, residing at Muncie, in the county of Delaware and State of Indiana, have invented certain new and useful Improvements in Corn-Huskers and Stalk-Cutters, of which the following is a specification.

My invention relates to improvements in machines for husking corn and cutting the stalks or fodder; and the object of my invention consists in the various constructions and combinations of parts hereinafter described, and set forth in the claims.

Figure 12:
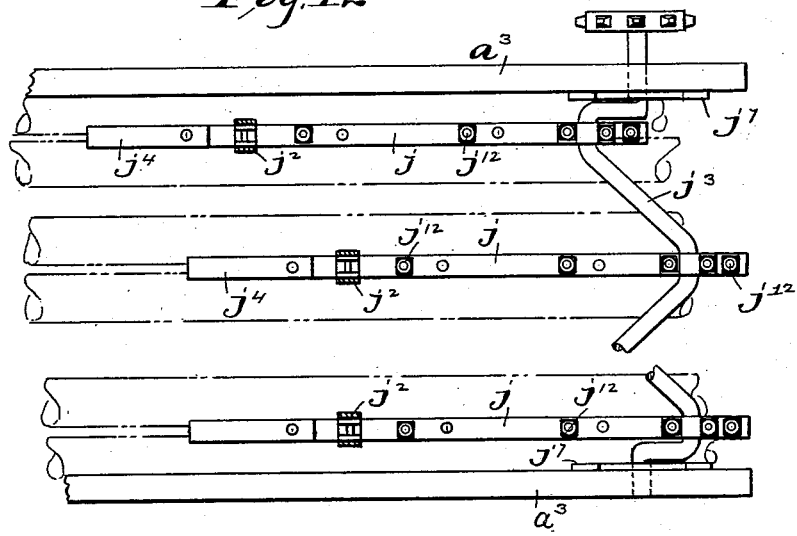
Figure 13:
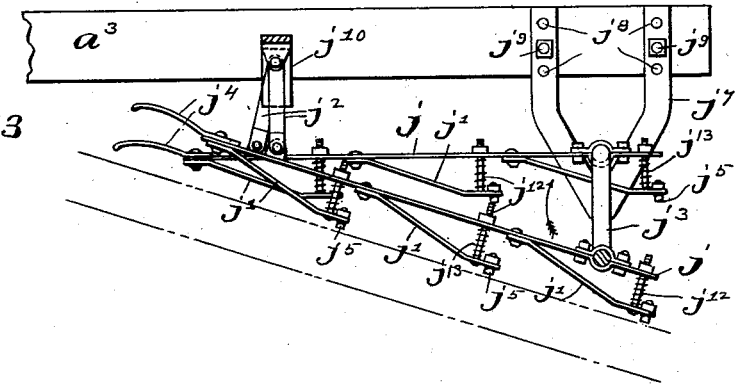
Figure 15:
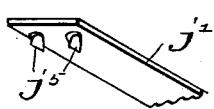
Figure 14:
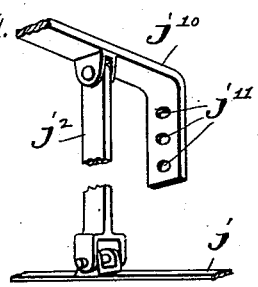

In the accompanying drawings, Figure 1 is a side elevation of a device embodying my invention. Figs. 1$^a$ and 1$^b$ are detail views of some of the driving parts of the same. Fig. 2 is a longitudinal sectional elevation of the same. Fig. 2$^a$ is an end view of the feed-table. Fig. 3 is a plan view of the husking-rolls and their adjusting and driving devices, some of the parts being shown broken away. Figs. 4, 5, and 6 are detail views of the adjusting and driving devices of the same. Fig. 7 is a sectional view of one of the rolls, showing the husking-pins. Fig. 8 is a detail view showing the end of the husking-rolls. Fig. 9 is a side elevation of a portion of the driving mechanism. Fig. 10 is a plan view, and Fig. 11 a sectional elevation, of the same. Figs. 12 to 14, inclusive, are detail views of a portion of the husking mechanism. Figs. 16, 17, and 18 are respectively a plan, a sectional elevation, and a side elevation, of portions of the elevator or carrier for the fodder. Figs. 19 and 20 are detail views of a portion of the supporting and driving devices of the elevator and carrier. Figs. 21 and 22 are detail views hereinafter referred to.

Like parts are represented by similar letters of reference in the several views.

The general construction of my improved machine comprises a frame $a\, a$, which is supported on carrying-wheels $a'\, a'$, journaled on opposite ends of axles $a^2\, a^2$. The main frame $a\, a$ is composed, essentially, of two auxiliary frames $a^3\, a^4$, one above the other and connected together by suitable supporting-standards $a^5$, four of which are employed. The upper frame $a^3$ is rectangular and is formed of channel-iron. The lower frame is rounded at one end and is also formed of channel-iron, preferably slightly heavier than the upper frame.

The stalks or fodder, with the corn thereon, to be husked, is fed from a feeding-table $b$, and the husking devices comprise stripping-rolls $b'\, b^2$, arranged adjacent to said table, and husking-rolls $b^3$, which are supported at an angle between the upper and lower frames $a^3\, a^4$. The stalks are fed by the stripping-rolls into a cutter $c$, and the cut fodder falls on a conveyer $d$, arranged below the husking-rolls, and is carried into an elevating-conveyer $e$ at the rear of the machine. The husks from the corn are carried in the usual manner between the husking-rolls $b^3$, which are arranged in pairs, and also fall on the carrier $d$ and are discharged with the cut stalks, the corn passing down along the husking-rolls and being discharged through a spout or conduit $b^4$ into the corn-elevator $f$, by which it is elevated into a wagon or other receptacle.

The cutter $c$ may be of any desired construction. The stripping-rolls $b'\, b^2$ serve as feeding-rolls to the cutter and are therefore preferably provided with projections on their peripheries to engage the stalks and carry them into the cutter. The lower roll is supported in a stationary bearing, and the upper roll is supported in a movable bearing, springs $b^5$ being employed to permit said upper roll to rise and fall with the varying quantities of stalks which are passed between said rolls. The ears of corn, being too large to pass between the rolls, will be stripped from the stalks and fall onto the husking-rolls $b^3$, which, as before stated, are arranged in pairs. Each of these husking-rolls is provided along its length with a series of husking-pins $b^6$, the detail construction of which is shown best in Fig. 7. These pins consist of rectangular pieces of steel, which are fitted into corresponding openings in a screw-threaded sleeve $b^7$. Each end of these pins is cut off at an angle, as shown, and they are fastened into the sleeves $b^7$ by keys $b^8$, which pass through the pins and sleeves, the construction being such that when one end of the pin becomes worn it may be reversed in the sleeve by removing said sleeve from the roll. The husking-rolls are preferably formed of cast-iron, and hollow. The sleeves are preferably formed of brass or other malleable material, and are each provided on their outer peripheries with a flange riveted down on the periphery of the roll when the sleeve is screwed into the same, so that the pins will all stand with their greatest width in the line of rotation of said roll. Each of the rolls $b^3$ is further provided with a series of grooves $b^9$, which are adapted to stand opposite the husking-pins of its supplemental roll.

As before stated, the husking-rolls are arranged in pairs, and they are supported at each end by supporting-bars $b^{10}$ $b^{11}$. These bars $b^{10}$ $b^{11}$ are connected together by longitudinal rods $b^{12}$, which pass through suitable openings in each of the bars, so as to tie the bars together. The rolls are provided at each end with journals which fit in bearings $b^{13}$ $b^{14}$, arranged in bearing-seats in said bars. One of the bearings, $b^{13}$, of each pair is movable. The other, $b^{14}$, is stationary. The movable bearing $b^{13}$ fits in a slotted opening in the supporting-bar and rests in contact with one end of a double-curve or S-shaped lever $b^{15}$, which is pivoted at $b^{16}$ to said bar, the other end being projected outwardly, so as to stand in line with a lug or projection $b^{17}$ on said bar. The ends of the lever $b^{15}$ and the lug $b^{17}$ are each perforated, and there is projected through the same a rod or bolt $b^{18}$, which is surrounded by a spring $b^{19}$. The end of the bolt $b^{18}$ is provided with an adjustable nut $b^{20}$, which rests against the end of the spring, the other end of the spring resting against the lug $b^{17}$, the construction being such that a yielding pressure is exerted on the end of the lever $b^{15}$, which forces the bearing $b^{13}$ yieldingly toward the bearing $b^{14}$ and holds the movable roll of each pair yieldingly in contact with or in proximity to its supplemental roll. The outer end of the lever $b^{15}$ is further provided with an adjusting-screw $b^{21}$, which passes through the same and rests in contact with the lug $b^{17}$ and forms an adjustable stop by means of which the movement of the yielding roll toward its supplemental roll may be determined. The nut $b^{20}$ furnishes means for adjusting the tension of the spring, and therefore the pressure on the yielding roll, and the S-shaped lever furnishes the means for transmitting the pressure of the spring to the movable rolls while the spring lies in a plane parallel to the supporting-bar and in convenient position for adjusting the parts.

The husking-rolls receive motion from a transverse shaft $g$, which is geared to each of the unyielding rolls by beveled gears $g'$ $g^2$, the motion being transmitted to the yielding rolls through spur-gears $g^3$ $g^4$. The frame which supports the husking-rolls is pivoted concentric with said shaft by means of hangers $g^5$, which are journaled on boxes or bearings $g^6$, in which the shaft $g$ turns, said bearings being supported on the auxiliary frame $a^3$. To provide for adjusting the angle of the husking-rolls, the lower end thereof is supported by links $g^7$, which are connected at one end with the supporting-frame $b^{11}$ and provided at the upper end with a screw-threaded hand-wheel $g^8$, which bears against a lug $g^9$ on one of the standards $a^5$, the lug being perforated to receive the link $g^7$ therethrough. To hold the frame securely in different positions of adjustment and prevent lateral movement thereof, set-screws $g^{10}$ are screw-threaded through lugs $g^{11}$ on said standard and adapted to bear against the end of the support $b^{11}$. The spaces between the respective pairs of rolls are closed by triangular blocks $b^{22}$, which are connected at each end to the supports $b^{10}$ $b^{11}$.

The power to drive the machine is applied to the pulley $c'$ at one end of the cutter-shaft $c$ from any suitable source of supply. This cutter-shaft is provided at the other end with a pulley $c^2$, which is connected by a belt $c^3$ to a pulley $c^4$ on the end of a transverse shaft $c^5$, supported on the lower auxiliary frame $a^4$. A sprocket-wheel $c^6$ on the shaft $c^5$ drives a chain $c^{17}$, which in turn drives a sprocket-wheel $c^7$ on the transverse shaft $g$. The sprocket-wheel $c^7$ has connected to or formed integral therewith a spur-gear $c^8$, which meshes with a spur-pinion $c^9$ on the end of one of the feeding-rolls $b^2$. The combined sprocket and gear wheel $c^7$ $c^8$ is journaled loosely on the shaft $g$, and is provided with a clutch $c^{10}$, adapted to be engaged by a clutch-collar $g^{12}$, which is connected to the shaft $g$ so as to turn therewith, but to be movable longitudinally thereon in a well-known manner. A bell-crank lever $g^{13}$, hinged to the upper auxiliary frame $a^3$, is adapted to engage in the clutch-collar, and, when moved, to move said collar longitudinally on the shaft, so as to engage or disengage the clutch. This bell-crank lever $g^{13}$ is connected by a link $g^{14}$ to a crank-shaft $g^{15}$ on the lower auxiliary frame $a^4$. A foot-lever $g^{16}$ on said crank-shaft serves to move said shaft and thus operate said clutch, a spring $g^{17}$ being preferably employed, which holds said clutch-collar normally out of engagement with the clutch $c^{10}$, in which case the shaft $g$ and the husking-rolls remain at rest. By pressing on the foot-lever $g^{16}$ the clutch-collar is thrown into engagement and causes the shaft $g$ and the husking-rolls to be revolved. The foot-lever $g^{16}$ is placed adjacent to and above a platform $h$, on which the operator stands to feed the machine. While the machine is being fed, the operator keeps his foot on the foot-lever, and thus keeps the husking-rolls in operation. By reason of the foot-lever the husking-rolls can immediately be stopped, and thus prevent the danger of accidents.

There is a tendency in machines of this character for the corn to bunch at the upper end of the husking-rolls and when started down along the husking-rolls to pass rapidly down the same, so that the husks are not always engaged by the husking-pins or the rolls. To prevent this, I employ above each pair of husking-rolls a vibrating auxiliary device, which consists of a flat bar $j$, having riveted thereto a series of spring-pressed auxiliary bars $j'$, which are brought into contact with the moving corn and press the same against the husking-rolls. These bars are each hinged at one end to pivoted links $j^2$ and are journaled at or near the other end on a crank-shaft $j^3$. Each of the bars is further provided at the upper end with a hook-shaped projection $j^4$. Means are provided for revolving the crank-shaft $j^3$, so as to carry the bars and their auxiliary bars $j'$ longitudinally along and above the husking-rolls in the opposite direction to which the corn is moving during the remaining portion of the revolution of the crank-shaft $j^3$, said bars being elevated and carried away from said corn and out of contact therewith. As the bars make the return stroke, the hook-shaped projections $j^4$ are, by reason of the pivoted connection of this end thereof, depressed, while the other end is elevated. These hook-shaped projections are therefore caused to engage the corn which may be bunched at the upper ends of the husking-rolls and feed it downwardly between the same, the construction being such that the hooking and feeding of the corn are produced during one portion of the stroke of the crank and the retarding and depressing of the corn against the husking-rolls during the other portion of the revolution of the crank-shaft.

To further assist in starting the husks between the husking-rolls, I provide in the lower ends of the auxiliary bars $j'$ pointed projections $j^5$, which have a tendency to slit the husks and raise them slightly from the ear, so that the husking pins and rolls will more readily engage and remove the same. The crank-shaft $j^3$ is preferably driven, through a suitable driving-chain $j^6$ and sprocket-wheels, from the transverse shaft $c^5$. To provide for adjusting these bars and feeding devices, the crank-shaft is supported in U-shaped supports $j^7$, provided with a series of openings $j^8$ to receive fastening-bolts $j^9$, which connect said supports to the auxiliary frame $a^3$. The links $j^2$ are also pivoted to a U-shaped bar $j^{10}$, connected at each end to the sides of the auxiliary frame $a^3$ by suitable fastening devices, which are adapted to pass through a series of openings $j^{11}$ in the ends of said U-shaped bar. Means are thus provided by which these vibrating bars may be raised or lowered, and by swinging the said supports on their fastening-bolts they may be shifted longitudinally along the husking-rolls. The auxiliary arms or bars $j'$ are connected at their free ends to the longitudinal bars $j$ by bolts $j^{12}$, which pass loosely through said longitudinal bars and are provided with springs $j^{13}$, which press said auxiliary bars normally away from the longitudinal bars, but permit them to yield when in contact with the ears of corn.

The fodder-elevator $e$ consists of the usual trough or conduit $e'$, which is preferably hinged in two parts, as shown at $e^2$, so as to be folded for transportation, an endless carrier being mounted within said conduit in the usual manner. This trough or conduit $e'$ is supported at the lower end by trunnions $e^4$, which also serve as bearings for the shaft $e^5$, which drives the endless carrier. These trunnions $e^4$ are journaled in standards $e^6$, which are connected to or formed integral with a ring $e^7$, which is adapted to turn on supporting plates or ways $e^8$, the parts being preferably formed with intermeshing parts, as shown at $e^9$, which permit a rotary movement thereof without any lateral displacement. The ways $e^8$ are supported by arms $e^9$ from a cross-bar $e^{10}$, forming a part of the lower auxiliary frame $a^4$. The power to drive the conveyer $e^3$ is conveyed through a shaft $e^{11}$, having a beveled gear $e^{12}$, which engages with the beveled portion of the combined spur and beveled gear $e^{13}$, which is journaled on a stud $e^{14}$ at the center of rotation of the ring $e^7$. The spur portion of the combined gear $e^{13}$ engages with the spur portion of a similar combined gear $e^{15}$, the beveled portion of which engages with a beveled gear $e^{16}$ on the shaft $e^5$. The combined beveled and spur gear $e^{15}$ is journaled on a stud $e^{17}$, which is supported on the ring $e^7$ and travels therewith, the construction being such that the conveyer may be driven in any position of rotation around the stud $e^{14}$. The shaft $e^{11}$ receives its motion through the medium of a suitable driving-chain $d^7$ and sprocket-wheels from a transverse shaft $d'$, which also drives the endless carrier $d^2$ in the conveyer $d$. This shaft $d'$ is in turn driven by a chain $d^3$ from a sprocket-wheel $d^4$ on the transverse shaft $c^5$, an idler $d^6$ being provided for this chain, so that the top of the sprocket $d^4$ engages with the bottom of the chain, so as to insure the proper direction of motion.

To provide for supporting the elevating-conveyer $e$ when in operation and folding the same when not in use, I employ a rope or cable $e^{17}$, which is connected at one end to the conduit $e'$ and at the other passes over a suitable roller $e^{18}$ in the nature of a windlass, which is provided at one end with a spur-gear $e^{19}$, which engages with a pinion $e^{20}$, having a crank $e^{21}$, means being thus provided by which the conveyer may be raised or lowered, as desired, while it is at the same time permitted to swing around on the turn-table which supports the same. Projecting lugs $e^{22}$ carry a rod or other suitable support $e^{23}$, against which the conduit is adapted to rest when folded and turn upwardly, as shown in Fig. 1, for transportation.

The corn-elevator $f$ consists of the usual elevating-chain $f'$, arranged in a V-shaped box or conduit $f^2$. This chain $f'$ is driven from a sprocket-wheel $f^3$, arranged on a shaft $f^4$, which is supported in lugs or projections $f^5$, formed integral with a cap or cover $f^6$, which is connected to or formed integral with a stud $f^7$, on which is journaled a double-beveled gear $f^8$. This beveled gear receives its motion from a beveled pinion $f^9$ on a shaft $f^{10}$, having a sprocket-wheel $f^{11}$, which receives motion, through the medium of a chain $f^{12}$, from the transverse shaft $c^5$, which is provided with a suitable sprocket-wheel for this purpose. The double-beveled gear $f^8$ meshes with a similar-beveled gear $f^{13}$ on the shaft $f^4$, the cap or cover $f^6$ being cut away at the point of contact between said gears. The construction is such that the elevator may rotate about the stud $f^7$ and carries with it the cover $f^6$. The spur-gear $f^{13}$ is always in mesh with its driving-gear, no matter what position the elevator may occupy. At the same time the driving-gear is covered and protected except at the point of contact between said gears. The stud $f^7$ is supported in a suitable bearing-support $f^{14}$, which is connected to hinged arms $f^{15}$, pivoted at their upper ends to suitable lugs $f^{16}$, which are connected to the lower auxiliary frame $a^4$, so that when not in operation the driving mechanism for the elevator may be folded upwardly onto the main frame after the elevator proper has been removed therefrom, which may be accomplished by simply lifting the stud $f^7$ from its bearing in the bearing-support $f^{14}$. Means are thus provided by which the parts may be adjusted to any desired position in operation or folded in compact form for transportation.

The main frame is supported on the front axle by a universal-jointed connection $k$, which consists of a bell-crank-shaped arm $k'$, secured to said frame and resting in a socket $k^2$, secured to the axle. The tongue $k^3$ is provided with arms $k^4$, which are adapted to be connected to the axle through the medium of two-part bracket-arms $k^5$, which may be clamped to the axle in different positions of adjustment. When in condition for transportation, the tongue is connected to the bracket-arms $k^5$, and when in this position these bracket-arms stand outside and removed from the frame. They are, however, provided with projecting standards $k^6$, which are adapted, when in the proper position, to rest under the lower auxiliary frame $a^4$ and support the same firmly against lateral movement on said axle. This is accomplished by removing the tongue and sliding the bracket-arms $k^5$ on the axle, so as to bring the standards $k^6$ under the frame, in which position they are clamped to the axle and the parts thus unyieldingly connected together. When the standards are removed from the frame, the axle is permitted to vibrate to compensate for the inequalities in the roads over which the carrying-wheels pass and in changing direction.

The pinion $c^9$ on the end of the stripping-roll $b^2$ is formed integral with a hub $c^{10}$, having at its opposite end laterally-projecting teeth $c^{11}$, which engage with similarly-shaped teeth $c^{12}$ on a hub $c^{13}$, secured to the stripping-roll $b'$. These teeth form intermeshing gears; but the peculiarity of their construction is that the teeth extend entirely to the shafts or journals on which they are secured, so that a considerable separation of the stripping-rolls is permitted without disengaging the driving-teeth.

To provide for more readily discharging the ears from the husking-rolls after they have reached the lower end thereof, I construct said rolls at the ends with reduced portions $b^{23}$, having projections $b^{24}$. These reduced and extended portions on the different rolls of each pair are arranged so that they stand opposite each other as the rolls are revolved and the extended portions are brought successively in contact with the ears of corn, which tends to agitate the same and cause them to drop from the rolls into the chute or conduit which carries them to the elevator.

The table $b$, from which the corn is fed, is preferably constructed in two parts on different levels, as shown in Fig. 2$^a$. The main portion or table proper is of substantially the same width as the upper auxiliary frame, while the other auxiliary portion, $b^{25}$, is elevated slightly and overhangs from the side of the frame. This elevated portion is preferably placed at an angle and is elevated sufficiently to permit the main driving-belt to extend under the same, so that the extending table forms at the same time a cover or protection for said belt.

It will be seen from the above description that a machine is provided which is capable of husking corn, cutting the stalks and fodder, and delivering the husked corn into a proper receptacle, while the fodder is conveyed to any suitable point and discharged in a separate pile or receptacle.

Reference is here made to my divisional application, Serial No. 587,863, filed April 16, 1896, claiming matters herein shown, but not claimed.

Having thus described my invention, I claim—

1. In a corn-husker, the combination with the husking-rolls arranged on an incline as described, of the vibrating bars arranged above said rolls, a frame for supporting said bars, a crank-shaft journaled in said frame and one end of each of said bars, the opposite ends of said bars being connected by links to said frame, each of said bars having small cutting projections extending downwardly therefrom, means for rotating said crank-shaft whereby said bars are caused to move alternately away from and toward said rolls and travel longitudinally in one direction substantially parallel with said rolls and in the opposite direction to the ears of corn on said rolls with the sharpened projections engaging the husks of said ears, substantially as specified.

2. The combination with the inclined husking-rolls, the vibrating bars arranged above said rolls, and a frame supporting said bars, said bars being pivotally connected by links to said frame at one end and at the other journaled to a crank-shaft supported by said frame, said bars being each provided with an extended hook-shaped projection beyond said pivotal connection, and spring-pressed projections on said bars, the arrangement being such that the spring-pressed projections and the hook-shaped projections are alternately moved to and from the husking-rolls in opposite directions, substantially as specified.

3. The combination with the inclined husking-rolls, of the vibrating bars arranged above said husking-rolls, said bars being pivotally supported at one end and connected at the opposite end to a crank-shaft, hook-shaped projections on the ends of said vibrating bars extending beyond the pivotal connections of said bars, the construction being such that the vibrating bars and the hook-shaped projections are adapted to move alternately in opposite directions to and from the husking-rolls, substantially as specified.

4. The combination with the husking-rolls arranged in pairs and inclined as described, of a series of vibrating bars pivotally supported at one end and connected at the other to a revolving crank-shaft, as described, said bars being provided with extended hook-shaped projections extending beyond the pivotal support and having auxiliary spring-pressed bars connected thereto, said spring-pressed bars being provided with pointed projections, substantially as specified.

5. The combination with the inclined husking-rolls arranged in pairs, of a series of vibrating bars operated by a crank-shaft, as described, a pivoted support for each of said bars, and a hook-shaped projection on each of said bars extending beyond its pivoted support, and means for uniformly and simultaneously adjusting the respective pivotal connections, substantially as specified.

6. The combination with husking-rolls arranged in pairs, the rolls of each pair being provided with husking-pins and oppositely-arranged grooves, supporting-bars at each end for said rolls having bearing-seats and bearings for said rolls seated in said bars, the bearing-seat for one of the rolls of each pair being slotted so that the bearing can move therein, an S-shaped lever for each of said movable bearings pivoted in said supporting-bar so as to rest at one end in contact with said movable bearing and to extend downwardly from said bar at the opposite end, a lug on said bar, an adjustable rod extending through said S-shaped lever and said lug parallel with the supporting-bar, a spring on said rod, and a set-screw extending through the end of said bell-crank lever so as to contact with said lug, substantially as specified.

7. The combination with the husking-rolls arranged in pairs and supported at each end by supporting-bars having slotted openings, movable bearings for one of said rolls fitted into said slotted openings, and an S-shaped lever fitted in said bar so as to contact at one end with said movable bearing and extending at the opposite end at right angles to said bar, a stationary lug on the supporting-bar arranged opposite to the projecting end of said S-shaped lever, a connection from said bell-crank lever through said lug, a spring connected to said S-shaped lever and bearing at one end against said stationary lug, and an adjustable stop in said S-shaped lever adapted to contact with said lug, substantially as specified.

In testimony whereof I have hereunto set my hand this 27th day of August, A. D. 1895.

GEORGE C. JANNEY.

Witnesses:
CHAS. E. JOHNSON,
WILLIAM W. MANN.